United States Patent
Babic et al.

(10) Patent No.: US 9,034,525 B2
(45) Date of Patent: May 19, 2015

(54) IONICALLY-CONDUCTIVE AMORPHOUS LITHIUM LANTHANUM ZIRCONIUM OXIDE

(75) Inventors: Davorin Babic, Marietta, GA (US); Stanley Jones, Forest Park, GA (US)

(73) Assignee: Johnson IP Holding, LLC, Atlanta, GA (US)

( * ) Notice: Subject to any disclaimer, the term of this patent is extended or adjusted under 35 U.S.C. 154(b) by 1094 days.

(21) Appl. No.: 12/848,991

(22) Filed: Aug. 2, 2010

(65) Prior Publication Data

US 2011/0053001 A1 Mar. 3, 2011

Related U.S. Application Data (63) Continuation-in-part of application No. 12/163,044, filed on Jun. 27, 2008, now Pat. No. 8,211,496.

(51) Int. Cl.
*H01M 6/18* (2006.01)
*H01M 10/26* (2006.01)
*C04B 35/486* (2006.01)
(Continued)

(52) U.S. Cl.
CPC ............ *C04B 35/486* (2013.01); *C04B 35/624* (2013.01); *C04B 35/6264* (2013.01); *C04B 2235/3203* (2013.01); *C04B 2235/3227* (2013.01); *C04B 2235/441* (2013.01); *H01M 10/052* (2013.01); *H01M 10/0562* (2013.01); *H01M 2300/0068* (2013.01); *Y02E 60/122* (2013.01)

(58) Field of Classification Search
CPC ............... C04B 35/486; C04B 35/624; C04B 2235/3203; C04B 2235/441; C04B 2235/3227; H01M 10/052; H01M 10/0562; H01M 2300/0068
USPC ......................................... 429/321–322, 206
See application file for complete search history.

(56) References Cited

U.S. PATENT DOCUMENTS 3,237,078 A 2/1966 Mallory
3,393,355 A 7/1968 Whoriskey et al.
(Continued)

FOREIGN PATENT DOCUMENTS

DE 102007030604 A1 1/2009
EP 2037527 A1 3/2009
(Continued)

OTHER PUBLICATIONS

Machine English Translation of JP 2010-080426 to Kamimura.*
(Continued)

*Primary Examiner* — Milton I Cano
*Assistant Examiner* — Michael Dignan
(74) *Attorney, Agent, or Firm* — Panitch Schwarze Belisario & Nadel LLP (57) ABSTRACT

Amorphous lithium lanthanum zirconium oxide (LLZO) is formed as an ionically-conductive electrolyte medium. The LLZO comprises by percentage of total number of atoms from about 0.1% to about 50% lithium, from about 0.1% to about 25% lanthanum, from about 0.1% to about 25% zirconium, from about 30% to about 70% oxygen and from 0.0% to about 25% carbon. At least one layer of amorphous LLZO may be formed through a sol-gel process wherein quantities of lanthanum methoxyethoxide, lithium butoxide and zirconium butoxide are dissolved in an alcohol-based solvent to form a mixture which is dispensed into a substantially planar configuration, transitioned through a gel phase, dried and cured to a substantially dry phase.

12 Claims, 3 Drawing Sheets

(51) Int. Cl.
    *C04B 35/624* (2006.01)
    *C04B 35/626* (2006.01)
    *H01M 10/052* (2010.01)
    *H01M 10/0562* (2010.01)

(56) References Cited

U.S. PATENT DOCUMENTS

| | | | |
|---|---|---|---|
| 4,303,877 | A | 12/1981 | Meinhold |
| 4,614,905 | A | 9/1986 | Petersson et al. |
| 4,654,281 | A | 3/1987 | Anderman et al. |
| 4,719,401 | A | 1/1988 | Altmejd |
| 4,777,119 | A | 10/1988 | Brault et al. |
| 5,270,635 | A | 12/1993 | Hoffman et al. |
| 5,291,116 | A | 3/1994 | Feldstein |
| 5,314,765 | A | 5/1994 | Bates |
| 5,336,573 | A | 8/1994 | Zuckerbrod et al. |
| 5,338,625 | A | 8/1994 | Bates et al. |
| 5,362,581 | A | 11/1994 | Chang et al. |
| 5,387,857 | A | 2/1995 | Honda et al. |
| 5,411,592 | A | 5/1995 | Ovshinsky et al. |
| 5,445,906 | A | 8/1995 | Hobson et al. |
| 5,455,126 | A | 10/1995 | Bates et al. |
| 5,512,147 | A | 4/1996 | Bates et al. |
| 5,522,955 | A | 6/1996 | Brodd |
| 5,561,004 | A | 10/1996 | Bates et al. |
| 5,567,210 | A | 10/1996 | Bates et al. |
| 5,569,520 | A | 10/1996 | Bates |
| 5,597,660 | A | 1/1997 | Bates et al. |
| 5,612,152 | A | 3/1997 | Bates |
| 5,654,084 | A | 8/1997 | Egert |
| 5,778,515 | A | 7/1998 | Menon |
| 5,783,928 | A | 7/1998 | Okamura |
| 5,811,205 | A | 9/1998 | Andrieu et al. |
| 5,821,733 | A | 10/1998 | Turnbull |
| 6,139,986 | A | 10/2000 | Kurokawa et al. |
| 6,168,884 | B1 | 1/2001 | Neudecker et al. |
| 6,182,340 | B1 | 2/2001 | Bishop |
| 6,201,123 | B1 | 3/2001 | Daikai et al. |
| 6,242,129 | B1 | 6/2001 | Johnson |
| 6,255,122 | B1 | 7/2001 | Duncombe et al. |
| 6,387,563 | B1 | 5/2002 | Bates |
| 6,413,672 | B1 | 7/2002 | Suzuki et al. |
| 6,541,161 | B1 | 4/2003 | Scanlon, Jr. |
| 6,679,926 | B1 | 1/2004 | Kajiura et al. |
| 6,827,921 | B1 | 12/2004 | Singhal et al. |
| 6,887,612 | B2 | 5/2005 | Bitterlich et al. |
| 7,540,886 | B2 | 6/2009 | Zhang et al. |
| 7,557,055 | B2 | 7/2009 | Zhang et al. |
| 7,732,096 | B2 | 6/2010 | Thackeray et al. |
| 2001/0014505 | A1 | 8/2001 | Duncombe et al. |
| 2002/0048706 | A1 | 4/2002 | Mayes et al. |
| 2004/0081888 | A1 | 4/2004 | Thakeray et al. |
| 2006/0046149 | A1 | 3/2006 | Yong et al. |
| 2006/0068282 | A1 | 3/2006 | Kishi et al. |
| 2006/0287188 | A1 | 12/2006 | Borland et al. |
| 2007/0031323 | A1 | 2/2007 | Baik et al. |
| 2007/0148545 | A1 | 6/2007 | Amine et al. |
| 2007/0148553 | A1 | 6/2007 | Weppner |
| 2007/0264579 | A1 | 11/2007 | Ota |
| 2009/0004371 | A1* | 1/2009 | Johnson et al. ............ 427/126.1 |
| 2009/0068563 | A1 | 3/2009 | Kanda et al. |
| 2009/0081555 | A1 | 3/2009 | Teramoto |
| 2009/0092903 | A1* | 4/2009 | Johnson et al. ............... 429/322 |
| 2010/0047696 | A1 | 2/2010 | Yoshida et al. |
| 2010/0203383 | A1 | 8/2010 | Weppner |
| 2011/0223467 | A1 | 9/2011 | Shacklette et al. |

FOREIGN PATENT DOCUMENTS

| | | | |
|---|---|---|---|
| JP | 2010-080426 | A | 4/2010 |
| WO | 2009003695 | A2 | 1/2009 |

OTHER PUBLICATIONS

Thangadurai et al. "Investigations on electrical conductivity and chemical compatibility between fast lithium ion conducting garnet-like Li6BaLa2Ta2O12 and lithium battery cathodes." Journal of Power Sources 142 (2005) 339-334.*
Office Action issued Jul. 13, 2011 in U.S. Appl. No. 12/163,044.
Brinker et al, "SOL-GEL Science: The Physics and Chemistry of Sol-Gel Processing," Academic Press, pp. 21, 95, 453, 513, 675, 742, 787, and 837 (1990).
Cussen, "Structure and ionic conductivity in lithium garnets," Journal of Materials Chemistry, vol. 20, pp. 5167-5173 (2010).
Laughlin et al, "Using Sol-Gel Chemistry to Synthesize a Material with Properties Suited for Chemical Sensing," Journal of Chemical Education, vol. 77, No. 1, pp. 77-78 (2000).
Geiger et al, "Crystal Chemistry and Stability of 'Li7La3Zr2O12' Garnet: A Fast Lithium-Ion Conductor," Inorganic Chemistry, vol. 50, pp. 1089-1097 (2011).
Murugan et al, "Fast Lithium Ion Conduction in Garnet-Type Li7La3Zr2O12," Angewandte Chemie International Edition, vol. 46, pp. 7778-7781 (2007).
Peters et al, "Ionic conductivity and activation energy for oxygen ion transport in superlattices—The multilayer system CSZ (ZrO2 + CaO) / Al2O3," Solid State Ionics, vol. 178, Nos. 1-2, pp. 67-76 (2007).
Awaka et al, "Synthesis and structure analysis of tetragonal Li7La3Zr2O12 with the garnet-related type structure," Journal of Solid State Chemistry, vol. 182, No. 8, pp. 2046-2052 (2009).
Gao et al, "Sol-gel synthesis and electrical properties of Li5La3Ta2O12 lithium ionic conductors," Solid State Ionics, vol. 181, Nos. 1-2, pp. 33-36 (2009).
Kishida et al, "Microstructure of the LiCoO2 (cathode)/La2/3-xLi3xTiO3 (electrolyte) interface and its influences on the electrochemical properties," Acta Materialia, vol. 55, No. 14, pp. 4713-4722 (2007).
Notice of Allowance issued Mar. 16, 2012 in U.S. Appl. No. 12/163,044.
Int'l Search Report issued Jan. 6, 2012 in Int'l Application No. PCT/US2011/046289; Written Opinion.
Drabold, "Topics in the theory of amorphous materials," The European Physical Journal B, vol. 68, pp. 1-21 (2009).
Billinge, "The nanostructure problem," Physics, vol. 3, No. 25, pp. 1-3 (2010).
Popovici et al, "Sol-gel preparation and characterization of perovskite lanthanum lithium titanate," Journal of Materials Science, vol. 42, pp. 3373-3377 (2007).
Goodenough et al, "Challenges for Rechargeable Li Batteries," Chemistry of Materials, vol. 22, No. 3, pp. 587-603 (2010).
Owen, "Rechargeable lithium batteries," Chemical Society Reviews, vol. 26, pp. 259-267 (1997).
Song et al, "Review of gel-type polymer electrolytes for lithium-ion batteries," Journal of Power Sources, vol. 77, pp. 183-197 (1999).
Li et al, "Synthesis and characterization of Li ion conducting La2/3-xLi3xTiO3 by a polynnerizable complex method," Ceramics International, vol. 33, pp. 1591-1595 (2007).
Vijayakumar et al, "Synthesis of Fine Powders of Li3xLa2/3-xTiO3 Perovskite by a Polymerizable Precursor Method," Chemistry of Materials, vol. 16, No. 14, pp. 2719-2724 (2004).
Pham et al, "Synthesis and Characterization of Nanostructured Fast Ionic Conductor Li0.30La0.56TiO3," Chemistry of Materials, vol. 18, No. 18, pp. 4385-4392 (2006).
Allnatt et al, "Atomic transport in solids," Cambridge University Press, pp. ix-xiii (2003).
Elliott, "Physics of amorphous materials," Longman Scientific & Technical, Second Ed., pp. v-vi (1990).
Zallen, "The Physics of Amorphous Solids," Wiley-VCH, First Ed., pp. ix-xi (1983).
Huggins, "Advanced Batteries: Materials Science Aspects," Springer, First Ed., pp. xvii-xxx, 368-371 (2008).
West, "Basic Solid State Chemistry," John Wiley & Sons Ltd., Second Ed., pp. vii-xv, 346-351 (1999).
Ahn et al, "Characteristics of Amorphous Lithium Lanthanum Titanate Electrolyte Thin Films Grown by PLD for Use in Rechargeable Lithium Microbatteries," Electrochemical and Solid-State Letters, vol. 8, No. 2, pp. A75-A78 (2005).

(56) References Cited

OTHER PUBLICATIONS

Ahn et al, "Characteristics of perovskite (Li0.5La0.5)TiO3 solid electrolyte thin films grown by pulsed laser deposition for rechargeable lithium microbattery," Electrochemica Acta, vol. 50, pp. 371-374 (2004).

Ahn et al, "Effect of Li0.5La0.5TiO3 solid electrolyte films on electrochemical properties of LiCoO2 thin film cathodes with different rapid-thermal annealing conditions," Journal of Vacuum Science & Technology B, vol. 23, No. 5, pp. 2089-2094 (2005).

Xiong et al, "Effects of annealing temperature on structure and opt-electric properties of ion-conducting LLTO thin films prepared by RF magnetron sputtering," Journal of Alloys and Compounds, vol. 509, pp. 1910-1914 (2011).

Maqueda et al, "Structural, microstructural and transport properties study of lanthanum lithium titanium perovskite thin films grown by Pulsed Laser Deposition," Thin Solid Films, vol. 516, pp. 1651-1655 (2008).

Li et al, "Physical and electrochemical characterization of amorphous lithium lanthanum titanate solid electrolyte thin-film fabricated by e-beam evaportation," Thin Solid Films, vol. 515, pp. 1886-1892 (2006).

Furusawa et al, "Ionic conductivity of amorphous lithium lanthanum titanate thin film," Solid State Ionics, vol. 176, pp. 553-558 (2005).

J.B. Bates et al.; Rechargable Thin-Film Lithium Batteries; Oak Ridge National Laboratory Publication; Aug. 1993.

Y. Inaguma et al.; High Ionic Conductivity in Lithium Lanthanum Titanate; Solid State Communications, vol. 86, No. 10, pp. 689-693; 1993.

O. Bohnke et al,; Mechanism of ionic Conduction and Electrochemical Intercalation of Lithium into the Perovskite Lanthanum Lithium Titanate; Solid State Ionics 91 (1996) pp. 21-31.

P. Birke et al; Electrolytic Stability Limit and Rapid Lithium Insertion in the Fast-Ion-Conducting Li0.29La0.57TiO3 Perovskite-Type Compound; J. Electrochem. Soc., vol. 144, No. 6, Jun. 1997, The Electrochemical Society, Inc.

S. Stramare et al.; Lithium Lanthanum Titanates: A Review; Chem. Matter; 2003; 15, pp. 3974-3990.

Kai-Yun Yang et al.; Ionic to mixed ionic/electronic conduction transition of chemically lithiated Li0.33La0.56TiO3 at room temperature: Lithium-ion-motion dependent electron hopping; Applied Physics Letters 89, 024105 (2006).

Jun-Ku Ahn et al.; Characteristics of perovskite (Li0.5La0.5) TiO3 solid electrolyte thin films grown by pulsed laser deposition for rechargables lithium microbattery; Electrochimica Acta 50 (2004) pp. 371-374.

Shin-Ichi Furusawa et al.; Ionic conductivity of amorphous lithium lanthanum titanate thin film; Solid State Ionics 176 (2005) pp. 553-558.

Jun-Ku Ahn et al.; Characteristics of Amorphous Lithium Lanthanum Titanate Electrolyte Thin Films Grown by PLD for Use in Rechargeable Lithium Microbatteries: Electrochemical and Solid State Letters, 8 (2) A75-A78 (2005).

K. Kitaoka et al.; Preparation of La0.5Li0.5TiO3 perovskite thin films by the sol-gel method; Journal of Materials Science 32 (1997) pp. 2063-2070.

H. Jena et al.; Studies on the ionic transport and structural investigations of La0.5Li0.5TiO3 perovskite synthesized by wet chemical methods and the effect of Ce, Zr substitution at Ti site; Journal of Materials Science 40 (2005) pp. 4737-4748.

I.C. Popovici et al: Sol-gel preparation and characterization of perovskite lanthanum lithium titanate; J. Mater Sci (2007) 42; pp. 3373-3377.

U.S. Office Action issued Jan. 7, 2013 in U.S. Appl. No. 12/198,421.

Zhang et al, "Study on synthesis and evolution of sodium potassium niobate ceramic powders by an oxalic acid-based sol-gel method", Journal of Sol-Gel Science and Technology, vol. 57, pp. 31-35 (2011).

U.S. Office Action issued Jan. 24, 2012 in U.S. Appl. No. 12/198,421.

Nagata et al, "All solid battery with phosphate compounds made through sintering process," Journal of Power Sources, vol. 174, pp. 832-837 (2007).

U.S. Appl. No. 13/410,895, filed Mar. 2, 2012.

Kotobuki et al, "Fabrication of Three-Dimensional Battery Using Ceramic Electrolyte with Honeycomb Structure by Sol-Gel Process," Journal of the Electrochemical Society, vol. 157, No. 4, pp. A493-A498 (2010).

Machida et al, "All-Solid-State Lithium Battery with LiCo0.3Ni0.7O2 Fine Powder as Cathode Materials with an Amorphous Sulfide Electrolyte," Journal of the Electrochemical Society, vol. 149, No. 6, pp. A688-A693 (2002).

Lee et al, "The production of LiCoO2 cathode thick films for an all-solid-state microbattery," Journal of Ceramic Processing Research, vol. 8, No. 2, pp. 106-109 (2007).

Sanchez et al, "Chemical Modification of Alkoxide Precursors," Journal of Non-Crystalline Solids, vol. 100, pp. 65-76 (1988).

Kotobuki et al, "Compatibility of Li7La3Zr2O12 Solid Electrolyte to All-Solid-State Battery Using Li Metal Anode," Journal of the Electrochemical Society, vol. 157, No. 10, pp. A1076-A1079 (2010).

Xu, "Nonaqueous Liquid Electrolytes for Lithium-Based Rechargeable Batteries," Chemical Reviews, vol. 104, pp. 4303-4417 (2004).

Ramzy et al, "Tailor-Made Development of Fast Li Ion Conducting Garnet-Like Solid Electrolytes," Applied Materials & Interfaces, vol. 2, No. 2, pp. 385-390 (2010).

Kokal et al, "Sol-gel synthesis and lithium ion conductivity of Li7La3Zr2O12 with a garnet-related type structure," Solid State Ionics, vol. 185, pp. 42-46 (2011).

Glass et al, "Ionic conductivity of quenched alkali niobate and tantalate glasses," Journal of Applied Physics, vol. 49, No. 9, pp. 4808-4811 (1978).

Office Action issued May 1, 2014 in U.S. Appl. No. 13/410,895.

Brenier, "Stress and Moisture-Sorption in Ozone-Annealed Films of Zirconium Oxide Obtained from Sol-Gel," Journal of Sol-Gel Science and Technology, vol. 25, pp. 57-63 (2002).

Kreiter et al, "Sol-gel routes for microporous zirconia and titania membranes," J. Sol-Gel Sci. Technol., vol. 48, pp. 203-211 (2008).

Office Action issued Jan. 2, 2015 in U.S. Appl. No. 12/198,421 by Johnson.

Boyle et al, "All-Ceramic Thin Film Battery," Sandia Report SAND2002-3615 Unlimited Release, Printed Nov. 2002, 53 pages.

Chi-Lin et al, "Physical and electrochemical characterization of amorphous lithium lanthanum titanate solid electrolyte thin-film fabricated by e-beam evaporation," Thin Solid Films, vol. 515, pp. 1886-1892 (2006).

Kobayashi et al, "All-solid-state lithium secondary battery with ceramic/polymer composite electrolyte," Solid State Ionics, vol. 152-153, pp. 137-142 (2002).

Scanlon et al, AFRL-PR-WP-TM-2003-2135 "Lithium Polymer Battery," Nov. 2003, 22 pages.

\* cited by examiner

Electrochemical Impedance Spectroscopy (EIS) spectra of amorphous LLZO film
Nyquist Plots Full spectrum (left): Real axis intercept (right), Magnification of Full Spectrum ically-conductive amorphous lithium lanthanum zirconium oxide composition formable as an electrolyte medium for an electrochemical cell such as a battery cell.

IONICALLY-CONDUCTIVE AMORPHOUS LITHIUM LANTHANUM ZIRCONIUM OXIDE

RELATED APPLICATIONS

This application is a continuation-in-part of U.S. Nonprovisional Patent Application No. 12/163,044 filed Jun. 27, 2008, now U.S. Pat. No. 8,211,496, issued Jul. 3, 2012, the entirety of which is hereby incorporated by reference.

TECHNICAL FIELD

This invention relates to ionically-conductive materials useful as electrolyte mediums in electrochemical cells, and more particularly, the invention relates to an ionically-conductive amorphous lithium lanthanum zirconium oxide composition formable as an electrolyte medium for an electrochemical cell such as a battery cell.

BACKGROUND OF THE INVENTION

A battery cell is a useful article that provides stored electrical energy that can be used to energize a multitude of devices, particularly portable devices that require an electrical power source. The cell is an electrochemical apparatus typically formed of at least one ion-conductive electrolyte medium disposed between a pair of spaced-apart electrodes commonly known as an anode and a cathode. Electrons flow through an external circuit connected between the anode and cathode. The electron flow is caused by the chemical-reaction-based electric potential difference between the active anode material and active cathode material. The flow of electrons through the external circuit is accompanied by ions being conducted through the electrolyte between the electrodes.

Electrode and electrolyte cell components typically are chosen to provide the most effective and efficient battery for a particular purpose. Lithium is a desirable active anode material because of its light weight and characteristic of providing a favorable reduction potential with several active cathode materials. Liquid and aqueous electrolytes have often been chosen because of favorable ion-conducting capabilities. Despite the benefits provided by certain anode materials and electrolytes, the materials themselves and, often, the combination of a particular electrode material and a particular electrolyte can cause problems in cell performance and, in some instances, can create a hazardous condition. For example, as advantageous as lithium can be as an active anode material, it can be degraded and otherwise react undesirably with such common mediums as air and water, and certain solvents. As a further example of problems, certain liquids that are useful as effective electrolytes can create hazardous conditions when serving as components of a lithium-ion battery.

For the reasons broadly stated above, it is often desirable to use a non-aqueous and non-liquid electrolyte medium in cells. Non-aqueous electrolyte mediums are desired because water can interact undesirably with some desirable electrode materials such as lithium. Non-liquid electrolyte mediums are desired for several reasons. One reason is that liquid electrolytes often react detrimentally with desirable electrode substances such as lithium even though the liquid is non-aqueous. Another reason that liquid electrolytes can be undesirable is the need to prevent electrolytic material from freely flowing beyond a predetermined geometric boundary configuration. For example, leakage of electrolyte solution from the battery container is typically undesirable. Another problem with liquid electrolytes is that some solvents that are used as effective non-aqueous, liquid electrolytes are flammable and have a relatively high vapor pressure. The combination of flammability and high-vapor pressure creates a likelihood of combustion. Further in this regard, batteries that use lithium-based anodes can pose severe safety issues due to the combination of a highly volatile, combustible electrolyte and the active nature of lithium metal.

Some of the problems associated with particular cell electrodes and electrolyte can result in internal failure of the cell. One type of internal failure is the discharge of electric current internally, within the cell, rather than externally of the cell. Internal discharge may also be referred to as "self-discharge." Self-discharge can result in high current generation, overheating and ultimately, a fire. A primary cause of self-discharge has been dendritic lithium growth during recharge of a rechargeable battery. In rechargeable cells having lithium anodes, dendrites are protuberances extending from the anode base that are formed during imperfect re-plating of the anode during recharge. Dendrites or growths resulting from low-density lithium plating during recharge can grow through the separator that separates anode from cathode particularly if the separator is porous or solid but easily punctured by the growth. When the growths extend far enough to interconnect the anode and cathode, an internal electrical short circuit is created through which current can flow. Electrical current produces heat that will vaporize a volatile electrolyte substance. In turn, vaporization of the electrolyte can produce extreme pressure within the battery housing or casing which can ultimately lead to rupture of the housing or casing. The temperatures that result from an electrical short circuit within a battery are sometimes high enough to ignite escaping electrolyte vapors thereby causing continuing degradation and the release of violent levels of energy. Lithium-ion batteries were developed to eliminate dendritic lithium growth by utilizing the lithium ions inserted into graphite anodes rather than re-platable lithium metal anodes. Although these lithium-ion batteries are much safer than earlier designs, violent failures still occur.

Ion-conductive, solid-glass electrolytes and ceramic electrolytes have been developed in the past to address the need for an electrolyte medium without the shortcomings described above. These solutions have included glass electrolyte materials such as Lithium Phosphorous Oxy-Nitride (LiPON) and a class of glass-ceramic materials generally referred to as LiSICON (an acronym for Lithium Super-Ionic Conductor) structure-type materials and NaSICON (an acronym for Sodium Super-Ionic Conductor, wherein the "Na" portion of the acronym is the chemical symbol for sodium) structure-type materials. However, these materials have limitations. LiPON has low ionic conductivity, in the range of 1.2E-6 S/cm, and generally can only be applied or used as thin films less than 10 μm thick. In addition, it has to be produced using a reactive sputtering process in a low vacuum environment which can be very expensive. LiPON is also unstable in contact with water which eliminates its possible use as a protective electrolyte in battery systems where exposure to moisture or ambient air may occur. On the other hand LiSICON and NaSICON structure-type materials are stable in contact with water but are unstable in contact with lithium. When in contact with lithium this class of materials turns dark and can conduct electric current by electron flow thus minimizing usefulness as electrolyte separators.

Thus it can be appreciated that it would be useful to have a cell electrolyte medium that is a conductor of ions, that is protective of and stable in contact with lithium, that is non-aqueous, that is non-liquid, that is non-flammable and that does not produce short circuits that are associated with dendritic plating of lithium.

SUMMARY OF THE INVENTION

According to a first embodiment the invention provides an amorphous oxide-based compound having a general formula $M_wM'_xM''_yM'''_z$, wherein M comprises at least one lithium-set element from a lithium set consisting of the alkali-metal family of the Periodic Table, M' comprises at least one lanthanum-set element from a lanthanum set consisting of lanthanum, barium, strontium, calcium, indium, magnesium, yttrium, scandium, chromium, aluminum, lutetium, potassium, the alkali-metal family of the Periodic Table and the lanthanide series of the Periodic Table, M" comprises at least one zirconium-set element from a zirconium set consisting of zirconium, tantalum, niobium, antimony, tin, hafnium, bismuth, tungsten, silicon, selenium, gallium and germanium, and M''' comprises at least one oxygen-set element from an oxygen set consisting of oxygen, sulfur, selenium, and the halogen family of the Periodic Table of Elements, and wherein w, x, y, and z are positive numbers including various combinations of integers and fractions or decimals.

In accordance with an aspect of the first embodiment, M comprises lithium, M' comprises lanthanum, M" comprises zirconium and M''' comprises oxygen.

In accordance with another aspect of the first embodiment, by percentage of total number of atoms, M comprises from about 0.1% to about 50%, M' comprises, from about 0.1% to about 25%, M" comprises from about 0.1% to about 25%, M''' comprises from about 30% to about 70%, and carbon comprises from 0.0% to about 25%.

According to a second embodiment of the present invention, an electrolyte medium for an electrochemical cell comprises a layer of amorphous lithium lanthanum zirconium oxide.

In accordance with an aspect of the second embodiment, the layer of amorphous lithium lanthanum zirconium oxide comprises by percentage of total number of atoms from about 0.1% to about 50% lithium, from about 0.1% to about 25% lanthanum, from about 0.1% to about 25% zirconium, from about 30% to about 70% oxygen and from 0.0% to about 25% carbon.

According to a third embodiment of the present invention, a method for synthesizing an amorphous oxide-based compound comprises substantially dissolving in a quantity of an alcohol-based solvent to produce a mixture, quantities of an alkoxide of at least one lithium-set element from a lithium set consisting of the alkali-metal family of the Periodic Table, an alkoxide of at least one lanthanum-set element from a lanthanum set consisting of lanthanum, barium, strontium, calcium, indium, magnesium, yttrium, scandium, chromium, aluminum, lutetium, potassium, the alkali-metal family of the Periodic Table and the lanthanide series of the Periodic Table, an alkoxide of at least one zirconium-set element from a zirconium set consisting of zirconium, tantalum, niobium, antimony, tin, hafnium, bismuth, tungsten, silicon, selenium, gallium and germanium, and an alcohol-soluble precursor of at least one of sulfur, selenium, and the halogen family of the Periodic Table of Elements, dispensing said mixture in a substantially planar configuration, transitioning through a gel phase, and drying and curing to a substantially dry phase.

According to a fourth embodiment of the invention, amorphous lithium lanthanum zirconium oxide is synthesized by substantially dissolving quantities of a lanthanum alkoxide, a lithium alkoxide, and a zirconium alkoxide in a quantity of an alcohol-based solvent to produce a mixture; then dispensing the mixture into a substantially planar configuration, transitioning through a gel phase, and drying and curing to a substantially dry phase.

In accordance with an aspect of the fourth embodiment, the alcohol-based solvent comprises methoxyethanol.

In accordance with another aspect of the fourth embodiment, the lanthanum alkoxide comprises lanthanum methoxyethoxide, the lithium alkoxide comprises lithium butoxide and the zirconium alkoxide comprises zirconium butoxide.

In accordance with yet another aspect of the fourth embodiment, the quantity of lanthanum methoxyethoxide comprises an amount of lanthanum methoxyethoxide pre-dissolved in an amount of the alcohol-based solvent to produce a lanthanum methoxyethoxide solution comprising about 12% by weight lanthanum methoxyethoxide.

In accordance with an additional aspect of the fourth embodiment, the quantity of zirconium butoxide comprises an amount of zirconium butoxide pre-dissolved in an amount of butanol to produce a zirconium butoxide solution comprising about 80% by weight said zirconium butoxide.

In accordance with yet an additional aspect of the fourth embodiment, the quantity of lanthanum methoxyethoxide comprises about 4.5 grams of the lanthanum methoxyethoxide solution, the quantity of lithium butoxide comprises about 0.65 grams thereof, the quantity of zirconium butoxide comprises about 0.77 grams of the zirconium butoxide solution and the alcohol-based solvent comprises about 5 grams of methoxyethanol.

In accordance with a further aspect of the fourth embodiment, the mixture is dispensed into a substantially planar configuration by one of spin coating, casting, dip coating, spray coating, screen printing or ink-jet printing.

According to a fifth embodiment of the invention, amorphous lithium lanthanum zirconium oxide is synthesized by substantially dissolving quantities of a lanthanum alkoxide, a lithium alkoxide, a zirconium alkoxide and a polymer in a quantity of an alcohol-based solvent to produce a mixture; then dispensing the mixture into a substantially planar configuration, transitioning through a gel phase, and drying and curing to a substantially dry phase.

In accordance with an aspect of the fifth embodiment, the alcohol-based solvent comprises methoxyethanol and the polymer comprises polyvinyl pyrrolidone.

In accordance with another aspect of the fifth embodiment, the lithium alkoxide comprises lithium butoxide, the lanthanum alkoxide comprises lanthanum methoxyethoxide, and the zirconium alkoxide comprises zirconium butoxide.

In accordance with yet another aspect of the fifth embodiment, the quantity of lanthanum methoxyethoxide comprises an amount of lanthanum methoxyethoxide pre-dissolved in an amount of the alcohol-based solvent to produce a lanthanum methoxyethoxide solution comprising about 12% by weight lanthanum methoxyethoxide.

In accordance with an additional aspect of the fifth embodiment, the quantity of zirconium butoxide comprises an amount of zirconium butoxide pre-dissolved in an amount of butanol to produce a zirconium butoxide solution comprising about 80% by weight said zirconium butoxide.

In accordance with yet another additional aspect of the fifth embodiment, the quantity of polymer comprises an amount of polymer pre-dissolved in an amount of alcohol-based solvent to produce a polymer solution In accordance with a further aspect of the fifth embodiment, the quantity of lanthanum methoxyethoxide comprises about 4.5 grams of lanthanum methoxyethoxide solution, the quantity of lithium butoxide comprises about 0.65 grams thereof, the quantity of zirconium butoxide comprises about 0.77 grams of said zirconium butoxide solution, the quantity of polymer solution comprises not more than about 2 grams of polyvinyl pyrrolidone dissolved in about 5 grams of methoxyethanol, and the quantity of alcohol-based solvent comprises about 5 grams of methoxyethanol.

In accordance with yet a further aspect of the fifth embodiment, the mixture is dispensed into a substantially planar configuration by one of spin coating, casting, dip coating, spray coating, screen printing or ink-jet printing.

DETAILED DESCRIPTION

Embodiments of the present invention are described herein. The disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, at least some specific structural and functional details disclosed herein are not to be interpreted as limiting, but merely as a basis for the claims and as a representative basis for teaching one skilled in the art to variously employ the present invention.

Figure 1:
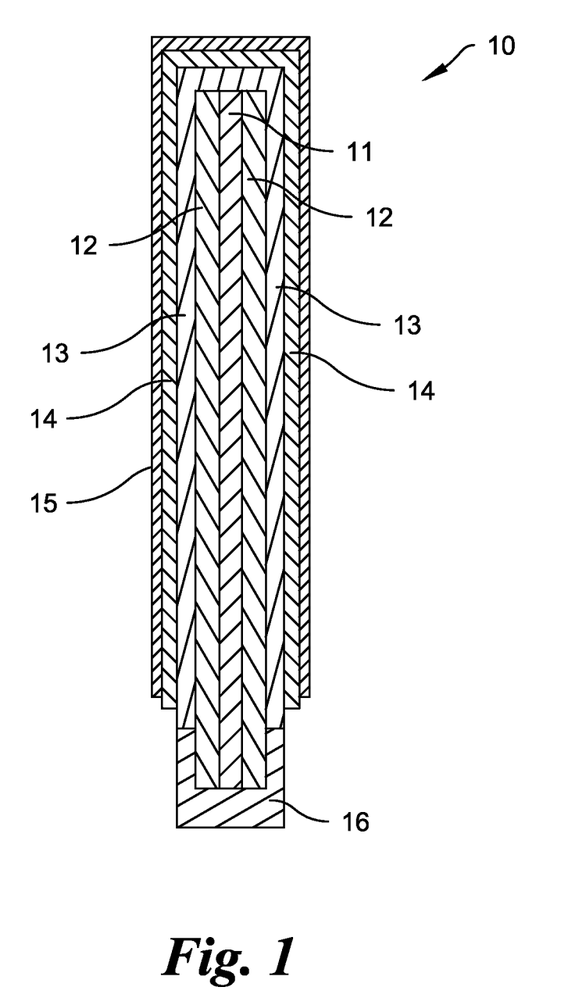
FIG. 1 is schematic representation of a cell suitable for incorporating an electrolyte medium in accordance with the present invention.

Referring to FIG. 1, therein is illustrated a cross-sectional, schematic representation of a battery cell, or electrochemical cell, 10 suitable for incorporating an electrolyte medium in accordance with the present invention. A centrally-disposed cathode current collector 11 is flanked on either side by a cathode 12. An electrolyte medium 13 is disposed in a U-shaped, face-contacting relationship with the cathodes 12. An anode 14 is disposed in a U-shaped, face-contacting relationship with the electrolyte medium 13. An anode current collector 15 is disposed in a U-shaped, face-contacting relationship with the anode 14. A cathode terminal 16 is disposed in contacting relationship with the cathode current collector 11 and cathode 12.

Overview

Lithium is a desirable substance to use as an electrode (particularly an anode) in a cell. This is because lithium is one of the lightest of elements while possessing high energy density and high specific energy. However, lithium is extremely undesirably reactive with water and is likewise undesirably reactive with many highly ionically-conductive liquid electrolytes. Thus it is desirable to have an electrolyte medium that is non-aqueous and non-liquid so as to be compatible with electrodes containing or consisting of lithium. A solid electrolyte is non-aqueous and non-liquid; however, some solid electrolytes still react undesirably with lithium. Thus, it is desirable to have an electrolyte medium that not only is non-aqueous and non-liquid but that is also otherwise compatible with electrodes that contain or comprise lithium.

Often, batteries are used in applications that require unique geometries and physical specifications for the battery package. For example, batteries are used in very small electronic devices that require that batteries therefor be sized on the order of millimeters or less. For applications requiring batteries of very small dimensions, it is important that the components of these battery cells perform effectively even though produced at a very small size. Thus it is important to have an electrolyte medium that is effective even though produced on an extremely small scale.

One method of producing cells of very small dimensions is to construct what are known as "thin-film" batteries. Typically, in thin-film battery cells the electrodes and electrolyte medium comprise substrates having a thin, film-like configuration. Thin-film batteries also have the advantage of potentially being flexible. The electrolyte medium for thin-film battery cells has to be effective even though produced at very small dimensions.

The Invention in Detail

The invention is an effective, ionically-conductive composition for an electrolyte medium. The invention further encompasses a method for producing the composition in general and a method for forming an electrolyte medium comprising the composition. The electrolyte medium taught by the invention is non-aqueous, non-liquid, inorganic, and compatible with lithium and lithium-containing compositions, and can be manufactured in thin-dimensioned and small-dimensioned configurations.

In an embodiment, the composition of the invention is amorphous lithium lanthanum zirconium oxide (for convenience, sometimes this composition is referred to herein as "LLZO"). The amorphous LLZO is highly ionically-conductive. It is inorganic and compatible with lithium. It can be used to produce a solid, thin-film electrolyte medium that facilitates incorporation into a small-dimensioned energy cell.

The amorphous LLZO is unique as an electrolyte medium as well as in and of itself. The invention teaches that the amorphous compound may have a chemical make-up wherein certain other elements may be partially or fully substituted for the four primary constituent elements lithium, lanthanum, zirconium and oxygen. Substitutes for lithium constituent include elements in the alkali-metal family of the Periodic Table. Substitutes for lanthanum constituent include barium, strontium, calcium, indium, magnesium, yttrium, scandium, chromium, aluminum, lutetium, potassium, the alkali-metal family of the Periodic Table and the lanthanide series of the Periodic Table. Substitutes for zirconium constituent include tantalum, niobium, antimony, tin, hafnium, bismuth, tungsten, silicon, selenium, gallium and germanium. Substitutes for the oxygen constituent include sulfur, selenium, and the halogen family of the Periodic Table.

In an embodiment, an amorphous compound has a general formula $M_w M'_x M''_y M'''_z$, wherein M comprises at least one lithium-set element from a lithium set consisting of the alkali-metal family of the Periodic Table, M' comprises at least one lanthanum-set element from a lanthanum set consisting of lanthanum, barium, strontium, calcium, indium, magnesium, yttrium, scandium, chromium, aluminum, lutetium, potassium, the alkali-metal family of the Periodic Table and the lanthanide series of the Periodic Table, M" comprises at least one zirconium-set element from a zirconium set consisting of zirconium, tantalum, niobium, antimony, tin, hafnium, bismuth, tungsten, silicon, selenium, gallium and germanium, and M'" comprises at least one oxygen-set element from an oxygen set consisting of oxygen, sulfur, selenium, and the halogen family of the Periodic Table of Elements, wherein w, x, y, and z are positive numbers including various combinations of integers and fractions or decimals.

The amorphous compound of the invention can be produced by a relatively simple and inexpensive processes. One broad category of process is a sol-gel class of process. In an embodiment, the invention teaches adaptation of a sol-gel technique, which is generally known in chemistry, to form the ultimate, substantially solid compound and medium of the invention. In the invention's application of a sol-gel process a precursor solution mixture is derived from substantial dissolution of liquid or/and solid solutes in a solvent. The sol-gel technique is advantageous because it is not necessary to subject the amorphous-LLZO precursor ingredients to extreme high temperatures as is necessary in the case of solid-state reactions and other processes for producing solid-electrolyte mediums. Extreme high temperatures are unwanted because such temperatures can produce undesirable effects in electrolyte membranes that are formed and/or in associated components.

In an embodiment, the amorphous compound of the invention is created through a sol-gel methodology by processing alkoxides that contain desired end constituent elements. In an embodiment of methodology of the invention, alkoxides of each of four primary constituents described above are dissolved in a quantity of an alcohol-based solvent to produce a mixture; the mixture is dispensed in a substantially planar configuration, transitioned through a gel phase, and dried and cured to a substantially dry phase.

In an embodiment, alkoxides of other elements may be substituted for the four primary constituent element alkoxides. Thus, in an embodiment, an amorphous compound is synthesized by substantially dissolving quantities of an alkoxide of at least one lithium-set element from a lithium set consisting of the alkali-metal family of the Periodic Table, an alkoxide of at least one lanthanum-set element from a lanthanum set consisting of lanthanum, barium, strontium, calcium, indium, magnesium, yttrium, scandium, chromium, aluminum, lutetium, potassium, the alkali-metal family of the Periodic Table and the lanthanide series of the Periodic Table, an alkoxide of at least one zirconium-set element from a zirconium set consisting of zirconium, tantalum, niobium, antimony, tin, hafnium, bismuth, tungsten, silicon, selenium, gallium and germanium, and an alcohol-soluble precursor of at least one of sulfur, selenium, and the halogen family of the Periodic Table of Elements, in a quantity of an alcohol-based solvent to produce a mixture; dispensing the mixture in a substantially planar configuration, transitioning through a gel phase, and drying and curing to a substantially dry phase.

In an embodiment of the invention, in a method for synthesizing amorphous LLZO quantities of a lanthanum alkoxide, a lithium alkoxide, and a zirconium alkoxide are dissolved in a quantity of an alcohol-based solvent to produce a mixture. Suitable lanthanum alkoxide is lanthanum methoxyethoxide. Suitable lithium alkoxide is lithium butoxide. Suitable zirconium alkoxide is zirconium butoxide. Suitable alcohol-based solvent is methoxyethanol. The solutes and solvent are mixed in quantities and percentages to bring about substantially complete dissolution. The mixture (the precursor solution formed by mixing) is dispensed into a substantially planar configuration, processed through a "gel" phase, dried and cured to a substantially dry phase.

SYNTHESIS EXAMPLES

The ingredients in the examples described below are readily-obtainable chemical compositions that may be purchased from many different chemical suppliers in the United States such as but not limited to Gelest, Inc., which at the time of this writing is believed to have an address of Gelest, Inc., 11 E Steel Rd, Morrisville, Pa. 19067, and a website at www.gelest.com and Alfa Aesar, which at the time of this writing is believed to have an address at 26 Parkridge Rd, Ward Hill, Mass. 01835, and a website at http://www.alfa.com/en/gh100w.pgm.

Lithium butoxide is also know as lithium tert-butoxide (LTB); lithium t-butoxide; lithium tert-butoxide; lithium tert-butylate; 2-methyl-2-propanolithium salt; 2-methyl-2-propanol lithium salt; lithium tert-butanolate; tert-butoxylithium; tert-butylalcohol, lithium salt; lithium tert-butoxide solution; lithium butoxide min off white powder; and lithium 2-methylpropan-2-olate. It has the molecular formula $C_4H_9LiO$. It in particular may be purchased from Gelest, Inc.

Lanthanum methoxyethoxide is also known as lanthanum (III) 2-methoxyethoxide, lanthanum 2-methoxyethoxide; lanthanum methoxyethoxide; lanthanum methoxyethylate; and lanthanum tri(methoxyethoxide). It has the molecular formula $C_9H_{21}LaO_6$. It in particular may be purchased from Gelest, Inc.

Zirconium butoxide is also known as 1-butanol, zirconium (4+) salt; butan-1-olate, zirconium(4+); butyl alcohol, zirconium(4+) salt; butyl zirconate; butyl zirconate(IV); tetrabutoxyzirconium; tetrabutyl zirconate; zirconic acid butyl ester; zirconium tetrabutanolate; and zirconium tetrabutoxide. It has the molecular formula $C_{16}H_{36}O_4Zr$. It in particular may be purchased from Gelest, Inc.

Methoxyethanol is also known as 2-methoxyethanol (2ME); ethylene glycol monomethyl ether (EGME) and methyl cellosolve. It has the molecular formula $C_3H_8O_2$. It in particular may be purchased from Alfa Aesar.

After thorough mixing of the ingredients and substantially complete dissolution of the solutes, the resulting mixture is processed through a fluidized stage that includes, at least briefly, aspects of a gel state. The fully-mixed, applied and processed components produce an amorphous substrate of LLZO.

In the amorphous LLZO compound of the invention, the number of atoms of lithium, lanthanum, zirconium, and oxygen are proportional to one another within ranges as set forth in the table of Atomic Percentage(s) below. For convenience, the amorphous compound is referred to herein simply as LLZO although the compound may also contain carbon as a result of the synthesis process. Further, for convenience, the compound may be denoted by the general formula $Li_w La_x Zr_y O_z$ wherein w, x, y, and z are positive numbers including various combinations of integers and fractions or decimals representative of the proportional relationship of the elements to one another.

Carbon as additional element: The production techniques described herein for producing amorphous LLZO may produce a product that contains some quantity of carbon. The carbon is left over as a by-product from one or more of the organic compositions used as precursors in formulating the amorphous LLZO. The atomic percentage of carbon in the amorphous composition is in the range from 0.0% to about 25%.

The percentages of the number of atoms of each element as a proportion of the total number of atoms in the amorphous composition is as shown in the following table:

| Chemical Element in Amorphous Composition | Atomic Percentage of Each Element in the Composition |
| --- | --- |
| Lithium | from about 0.1% to about 50% |
| Lanthanum | from about 0.1% to about 25% |
| Zirconium | from about 0.1% to about 25% |
| Oxygen | from about 30% to about 70% |
| Carbon | from 0.0% to about 25% |

Example 1 of Production of Amorphous LLZO Electrolyte Medium

The amorphous LLZO precursor solution was prepared by dissolving about 4.5 grams of a lanthanum methoxyethoxide solution, about 0.65 gram of lithium butoxide and about 0.77 gram of a zirconium butoxide solution in about 5 grams of methoxyethanol.

Lanthanum methoxyethoxide and zirconium butoxide were used in solution form for convenience in mixing; however, the invention encompasses use of these compositions without being pre-dissolved. The lanthanum methoxyethoxide solution comprised lanthanum methoxyethoxide pre-dissolved in methoxyethanol whereby lanthanum methoxyethoxide comprised approximately 12% by weight of the total weight of the lanthanum methoxyethoxide solution. Similarly, the zirconium butoxide solution comprised zirconium butoxide pre-dissolved in butanol whereby zirconium butoxide comprised approximately 80% by weight of the zirconium butoxide solution.

The components may be mixed in any sequence as the sequence of mixing is not significant. The thoroughly-mixed precursor solution was left in a bottle in a dry environment for about 1 to 1.5 hours to help facilitate substantially complete dissolution of the lithium butoxide, the component that was not pre-dissolved. What is meant by "dry environment" is that moisture in the ambient air is low enough that lithium components are not degraded due to moisture.

Example 1(A)

Formation of Substrate by Spin Coating

The amorphous LLZO precursor solution was prepared as described above. The precursor solution was deposited by spin coating; however, it can be cast if so desired as described below. Spin coating was performed by known spin-coating processes at approximately 1200 rpm for about 15 seconds in a dry environment. The resulting layer of composition was placed in a closed container and exposed to an ozone-rich air environment (ozone concentration larger than 0.05 part per million (ppm)) for approximately 1 hour. The term "environment" refers to the enclosed space in which a process (or sub-process) is carried out in the methodology taught by the invention. A vaporous or gaseous element or composition in the enclosure facilitates the drying, curing or other desired chemical processing. A gas or vapor may be placed in a suitable enclosure by known chemical processing means. For example, a vapor or gas may be injected through a port. As a further example, a liquid may be placed in the enclosure and permitted (or caused) to vaporize thereby creating the desired vaporous or gaseous environment. In this step, as an alternative, the closed environment may be solvent-vapor-rich (for example wherein a quantity of a solvent such as methoxyethanol is disposed in the closed container in a liquid phase and permitted or caused to vaporize). As another alternative, the closed environment may contain a gaseous mixture of ozone-rich air and solvent-vapor-rich air. This was followed by heating at approximately 80° C. for about 30 minutes, also in an ozone-rich air environment. The LLZO coating and substrate were then heated at approximately 300° C. for 30 minutes in air. It is to be understood that the heating times and environmental factors such as humidity, temperature, and gaseous content of ambient air may be varied.

The described spin-coating process resulted in an amorphous LLZO layer whose thickness was approximately 250 nm. Thicker films or layers of amorphous LLZO may be formed by repeating the basic spin-coating processing steps multiple times until the desired thickness is achieved.

Example 1(B)

Formation of Substrate by Casting

The amorphous LLZO precursor solution was prepared as described above. For casting, the precursor solution optionally may be heated at approximately 100° C. under an inert gas to increase the density and viscosity of the solution. This optional step was utilized in some samples that were produced.

The amorphous LLZO precursor solution was cast on a suitable substrate that facilitated support and then selective release of the formed layer. The layer that was formed was initially a solution. After further processing the layer may transition into a film, or a powder, or a combination of two or more of solution, film and powder. The freshly-cast LLZO was placed in a closed container and exposed to ozone-rich air environment (ozone concentration larger than 0.05 ppm) for approximately 1 hour, although longer exposure times may be used as well. In this step, as an alternative, the closed environment may be solvent-vapor-rich (for example wherein a quantity of a solvent such as methoxyethanol is disposed in the closed container in a liquid phase and allowed to and/or caused to vaporize). As another alternative, the closed environment may contain a mixture of ozone-rich air and solvent-vapor-rich air. This was followed by heating at approximately 80° C. for 30 minutes or longer, also in an ozone-rich air environment. The LLZO material was then heated at approximately 300° C. for 30 minutes in air. It should be understood that the heating times and environmental factors such as humidity, temperature, and gaseous content of ambient air may be varied. The immediately-above described processing step for the layer of cast material may result in a thick layer of amorphous LLZO or amorphous LLZO powder, or, to some degree, a thin film.

Example 2 of Production of Amorphous LLZO Electrolyte Medium—Incorporation of PVP into Precursor The LLZO precursor solution was prepared in the following fashion. First, a quantity of a polymer, polyvinyl pyrrolidone (PVP), generally not exceeding 2 grams, was added to about 5 grams of methoxyethanol (2ME) and the mixture was allowed to sit for approximately 1 hour so that the PVP could be fully dissolved and form a substantially homogeneous PVP/2ME solution. Then about 4.5 grams of lanthanum methoxyethoxide solution, about 0.65 gram of lithium butoxide and about 0.77 gram of zirconium butoxide solution were dissolved in about 5 grams of methoxyethanol and approximately 1 gram of the PVP/2ME solution.

Predissolution of PVP in 2ME is not required but may be carried out in this manner for convenience in mixing. For example, a suitable amount of PVP may be added to 2ME at the same time that the other solution components such as lanthanum methoxyethoxide and zirconium butoxide are mixed together in the solvent. The order of mixing has no bearing on the final composition and function of the solution.

As in Example 1, lanthanum methoxyethoxide and zirconium butoxide were provided in solution form for convenience in mixing. The invention also encompasses use of these compositions without being pre-dissolved. The lanthanum methoxyethoxide solution comprised lanthanum methoxyethoxide pre-dissolved in methoxyethanol whereby lanthanum methoxyethoxide comprised approximately 12% by weight of the total weight of the lanthanum methoxyethoxide solution. Similarly, the zirconium butoxide solution comprised zirconium butoxide pre-dissolved in butanol whereby zirconium butoxide comprised approximately 80% by weight of the zirconium butoxide solution.

The components may be mixed in any sequence as the sequence of mixing is not significant. The thoroughly-mixed precursor solution was left in a bottle in a dry environment for about 1 to 1.5 hours to help facilitate substantially complete dissolution of the lithium butoxide, the component that was not pre-dissolved.

The LLZO precursor solution containing some PVP may be dispensed into a substrate configuration by either spin coating or casting as described in Example 1 above. Spin coating was done at approximately 1200 rpm for about 15 seconds. Both spin coating and casting are done in a dry environment. The freshly-coated LLZO was placed in a closed container and exposed to ozone-rich air environment (ozone concentration larger than 0.05 ppm) for approximately 1 hour. In this step, as an alternative, the closed environment may be solvent-vapor-rich (for example wherein a quantity of a solvent such as methoxyethanol, in liquid phase, is disposed in the closed container and permitted or caused to vaporize). As another alternative, the closed environment may contain a mixture of ozone-rich air and a solvent-vapor-rich air. This was followed by heating at approximately 80° C. for 30 minutes, also in an ozone-rich air environment. The LLZO coating and substrate were then heated at approximately 300° C. for 30 minutes in air. It should be understood that the heating times and environmental factors such as humidity, temperature, and gaseous content of ambient air may be varied. The immediately preceding processing step results in a layer or powder of amorphous LLZO that also contains a small PVP component.

Alternative Embodiments

The invention may be practiced by synthesizing an amorphous compound in which a different element is substituted for one or more of the constituent elements of the amorphous LLZO compound. Thus, the invention may also be practiced by fully or partially substituting for lithium, one or more chemical elements from the alkali metal family (or group) of the Periodic Table such as but not limited to potassium and sodium. And the invention also may be practiced by fully or partially substituting for lanthanum, one or more chemical elements from the group consisting of barium, strontium, calcium, indium, magnesium, yttrium, scandium, chromium, aluminum, lutetium, potassium, alkali metal elements in the alkali metal family (or group) of the Periodic Table such as but not limited to potassium, and elements in the lanthanoid (also know as lanthanide) series of the Periodic Table, such as but not limited to, for example, cerium and neodymium. And the invention also may be practiced by fully or partially substituting for zirconium, one or more chemical elements from the group consisting of tantalum, niobium, antimony, tin, hafnium, bismuth, tungsten, silicon, selenium, gallium and germanium. And, lastly, the invention further may be practiced by fully or partially substituting for oxygen, one or more elements from the group consisting of sulfur, selenium, and the halogen family (or group) of the Periodic Table.

Alternative Processing—All or some of the processing steps during spin coating and in subsequent processing may be carried out in either pure ozone ($O_3$) or an ozone-enriched air environment that is provided. Or, as a further alternative the environment may be solvent-vapor-rich (for example wherein a quantity of a solvent such as methoxyethanol is disposed in the closed container). As another alternative, the environment may contain a mixture of ozone-rich air and solvent-vapor-rich air.

Two sol-gel-type related preparation processes have been described above, namely, one directed to spin-coating for making thin films, and the other directed to casting for making thick layers or powder. The invention also may be practiced by employing other sol-gel and non-sol-gel related processes for depositing at least one layer of composition that ultimately results in the production of at least one layer of amorphous lithium lanthanum zirconium oxide. Such additional depositing processes include but are not limited to dip coating, spray coating, screen printing or ink-jet printing as well as various forms of sputtering, chemical vapor deposition (CVD) and other fabrication and deposition techniques.

Representative Test Results and Analytical Data for Amorphous LLZO Produced

The table below shows depth profile of composition for a typical amorphous LLZO thin film produced under the invention. The data presented are in the form of atomic percentages of the constituent atoms. The depth profile was achieved by sputtering away the exposed LLZO film surface at an approximate rate of 0.3 nm/s. The table was constructed from the X-ray photoemission spectroscopy (XPS) results that are presented in FIG. 2. In the table, "3d" and "1s" are energy level subshell designations.

Depth Profile of Composition of an Amorphous LLZO film

Figure 2:
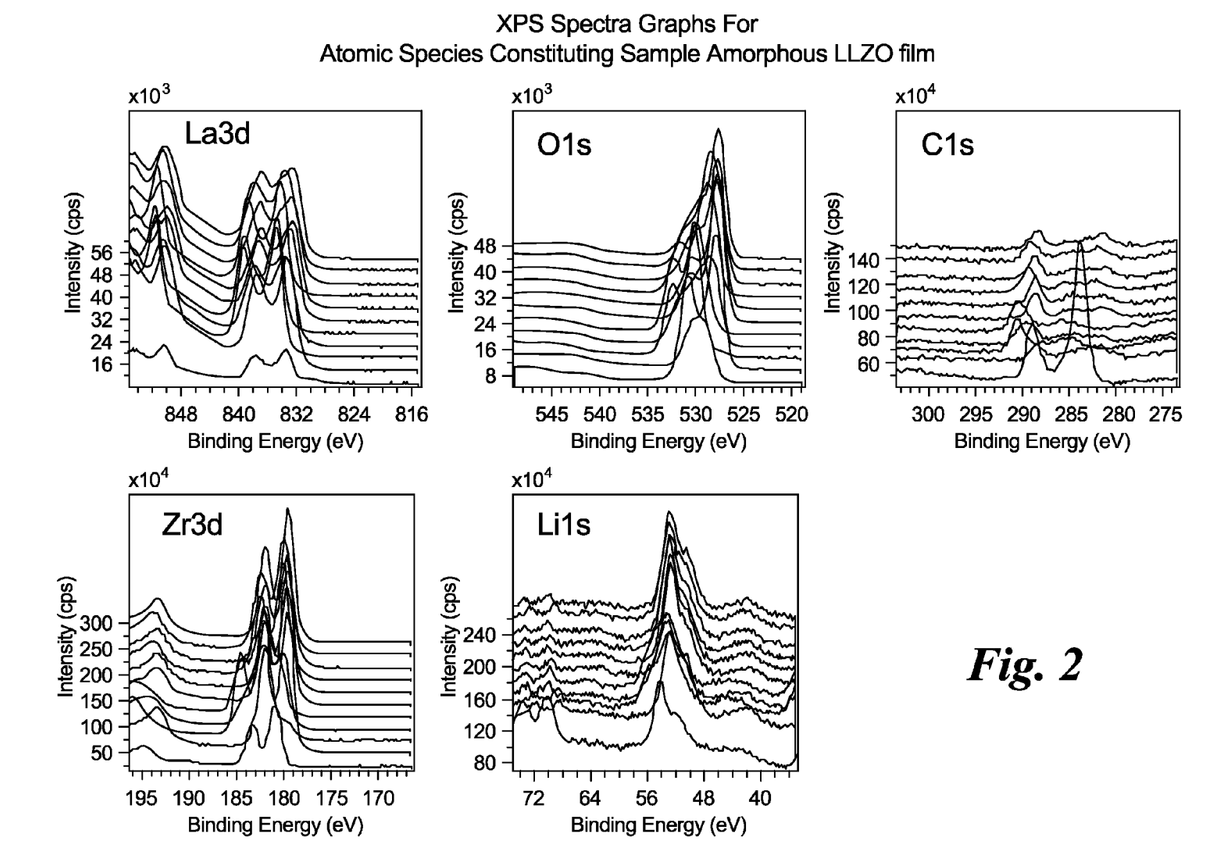
FIG. 2 shows XPS Spectra Graphs for atomic species for amorphous LLZO films of the invention.

| Sputter time | Atomic Concentration % | | | | |
|---|---|---|---|---|---|
| (s) | La 3d | O 1s | C 1s | Zr 3d | Li 1s |
| 0 | 2.5 | 37.2 | 32.0 | 3.7 | 24.6 |
| 200 | 10.3 | 49.6 | 8.3 | 10.0 | 21.8 |
| 400 | 10.6 | 53.3 | 10.0 | 10.0 | 16.1 |
| 600 | 8.9 | 50.5 | 8.9 | 8.5 | 23.2 |
| 800 | 9.2 | 51.9 | 9.4 | 8.9 | 20.6 |
| 1000 | 8.1 | 45.8 | 7.8 | 7.5 | 30.8 |
| 1200 | 8.1 | 47.4 | 8.3 | 7.8 | 28.4 |
| 1400 | 8.8 | 46.7 | 7.1 | 7.8 | 29.6 |
| 1600 | 8.6 | 47.0 | 8.5 | 8.0 | 27.9 |
| 1800 | 9.7 | 49.2 | 8.0 | 8.8 | 24.5 |
| 2000 | 9.8 | 48.7 | 8.2 | 8.9 | 24.3 |

Referring now to FIG. 2, therein is shown XPS spectra graphs for atomic species constituting an amorphous LLZO film. The set of spectra for each atom corresponds to the set of depth profiling produced by sputtering times discussed and shown in the table above. In the graphs of FIG. 2, each horizontal axis (x-axis) displays "Binding Energy" measured in electronvolts (eV) and each vertical axis (y-axis) displays "intensity" measured in "counts per second" (cps).

Figure 3:
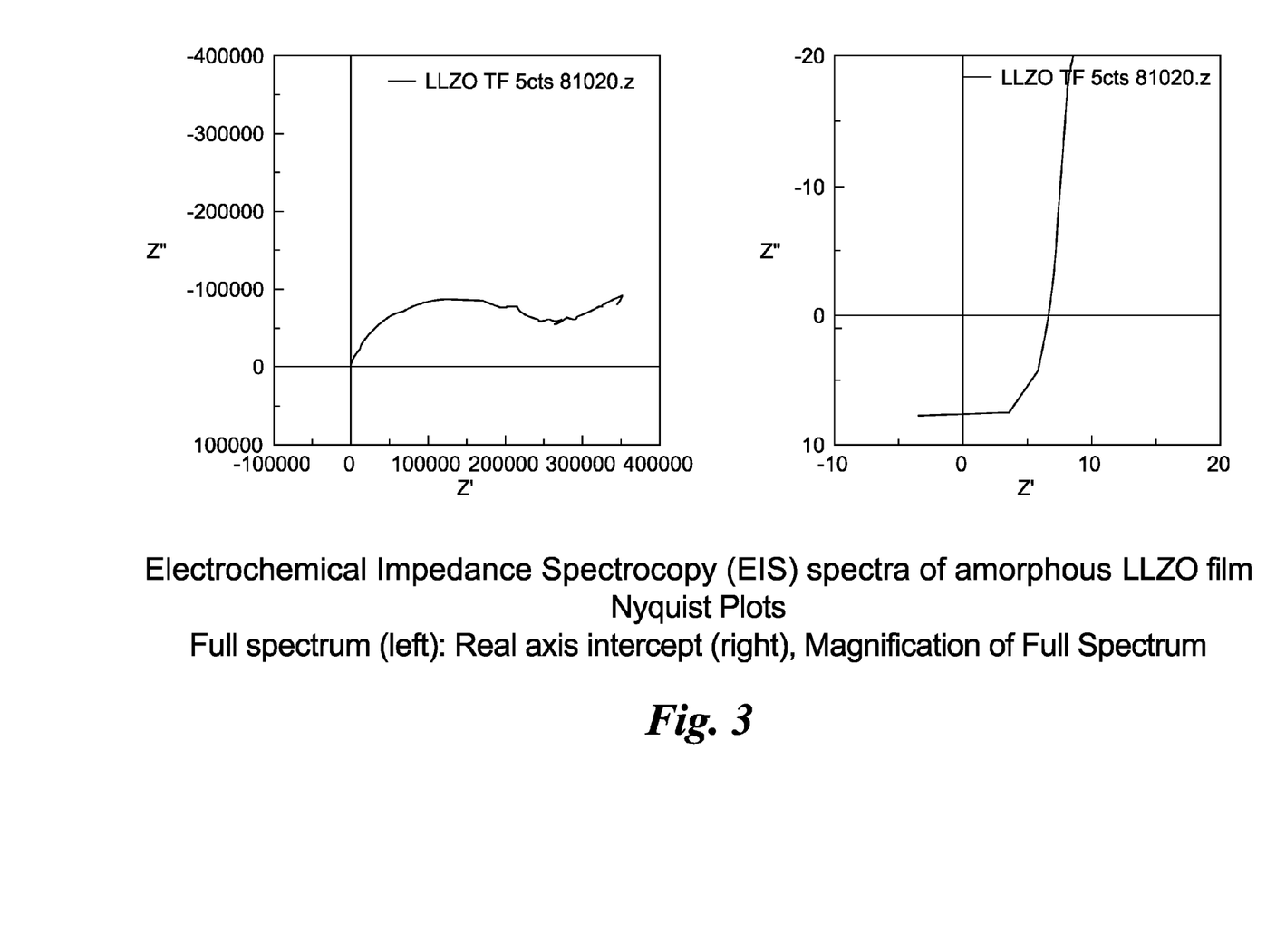
FIG. 3 is an electrochemical impedance spectroscopy spectra of LLZO films of the invention.

Referring now to FIG. 3, the ionic conductivity of amorphous LLZO product as taught by the invention was observed. Ionic conductivity of an amorphous LLZO thin film was measured by electrochemical impedance spectroscopy (EIS) taking high frequency real-axis intercept as the lithium ionic resistance of the sample from which the ionic conductivity was estimated taking the sample geometry into account. FIG. 3 shows measured EIS spectra of an amorphous LLZO thin film, full spectra on the left and the real axis intercept in detail on the right. The spectra are presented in the form of Nyquist plots. Each horizontal axis (x-axis) displays impedance (Z') in ohms and each vertical axis (y-axis) displays impedance (Z'') in ohms. The impedance that is measured by the EIS method is a complex number having both a real and an imaginary component. The real portion is displayed as impedance Z' on the horizontal axis and the imaginary portion is displayed as impedance Z'' on the vertical axis.

The EIS results indicate pure ionic conductivity of the sample, i.e. no evidence of electronic conductivity is observed. The ionic conductivity, estimated from the sample's film thickness of approximately 1.25 μm and area of 1 mm$^2$, is in the range 1 to 2 E-3 S/cm. This conductivity is very high for room-temperature ionic conductivity of an inorganic electrolyte.

Many variations and modifications may be made to the above-described embodiments without departing from the scope of the claims. All such modifications, combinations, and variations are included herein by the scope of this disclosure and the following claims.

The composition described herein is amorphous lithium lanthanum zirconium oxide (LLZO). It is ionically conductive and, if electronically conductive at all, only negligibly so. When formed as a thin layer, the amorphous LLZO is an effective electrolyte medium that is useful in an electrochemical cell in which lithium is employed as electrode material. The amorphous LLZO electrolyte medium is non-aqueous, non-liquid, inorganic, and non-reactive with lithium; will not leak or leach with respect to adjacent components of a battery cell; and can be manufactured in flexible, thin, useful layers.

The invention claimed is:

1. An amorphous oxide-based compound having a general formula $M_w M'_x M''_y M'''_z$,
    wherein
    M comprises at least one lithium-set element from a lithium set consisting of the alkali-metal family of the Periodic Table,
    M' comprises at least one lanthanum-set element from a lanthanum set consisting of lanthanum, barium, strontium, calcium, indium, magnesium, yttrium, scandium, chromium, aluminum, lutetium, potassium, the alkali-metal family of the Periodic Table and the lanthanide series of the Periodic Table,
    M'' comprises at least one zirconium-set element from a zirconium set consisting of zirconium, tantalum, niobium, antimony, tin, hafnium, bismuth, tungsten, silicon, selenium, gallium and germanium, and
    M''' comprises at least one oxygen-set element from an oxygen set consisting of oxygen, sulfur, selenium, and the halogen family of the Periodic Table of Elements,
    wherein w, x, y, and z are positive numbers including various combinations of integers and fractions or decimals, and wherein a ratio of x to y is about 1,
    and wherein the amorphous oxide-based compound has an ionic conductivity of about 1 to 2 E-3 S/cm.

2. The amorphous oxide-based compound of claim 1, wherein M comprises lithium, M' comprises lanthanum, M'' comprises zirconium and M''' comprises oxygen.

3. The amorphous oxide-based compound of claim 1, wherein by percentage of total number of atoms M comprises from about 0.1% to about 50%, M' comprises from about 0.1% to about 25%, M'' comprises from about 0.1% to about 25%, M''' comprises from about 30% to about 70%, and carbon comprises from 0.0% to about 25%.

4. The amorphous oxide-based compound of claim 1, having a substantially planar configuration for an electrolyte medium.

5. An electrolyte medium comprising at least one layer of amorphous lithium lanthanum zirconium oxide, wherein a ratio of lanthanum to zirconium is about 1, and wherein the lithium lanthanum zirconium oxide has an ionic conductivity of about 1 to 2 E-3 S/cm.

6. The electrolyte medium of claim 5, wherein said amorphous lithium lanthanum zirconium oxide comprises by percentage of total number of atoms from about 0.1% to about 50% lithium, from about 0.1% to about 25% lanthanum, from about 0.1% to about 25% zirconium, from about 30% to about 70% oxygen and from 0.0% to about 25% carbon.

7. An amorphous oxide-based compound having a general formula $M_w C M'_x M''_y M'''_z$,
    wherein
    M comprises at least one lithium-set element from a lithium set consisting of the alkali-metal family of the Periodic Table,
    C comprises carbon,
    M' comprises at least one lanthanum-set element from a lanthanum set consisting of lanthanum, barium, strontium, calcium, indium, magnesium, yttrium, scandium, chromium, aluminum, lutetium, potassium, the alkali-metal family of the Periodic Table and the lanthanide series of the Periodic Table,
    M'' comprises at least one zirconium-set element from a zirconium set consisting of zirconium, tantalum, niobium, antimony, tin, hafnium, bismuth, tungsten, silicon, selenium, gallium and germanium, and
    M''' comprises at least one oxygen-set element from an oxygen set consisting of oxygen, sulfur, selenium, and the halogen family of the Periodic Table of Elements,
    wherein w, x, y, and z are positive numbers including various combinations of integers and fractions or decimals, by percentage of total atoms carbon comprises up to about 25%, and wherein a ratio of x to y is about 1,
    and wherein the amorphous oxide-based compound has an ionic conductivity about 1 to 2 E-3 S/cm.

8. The amorphous oxide-based compound of claim 7, wherein M comprises lithium, M' comprises lanthanum, M'' comprises zirconium and M''' comprises oxygen.

9. The amorphous oxide-based compound of claim 7, wherein by percentage of total number of atoms M comprises from about 0.1% to about 50%, M' comprises from about 0.1% to about 25%, M'' comprises from about 0.1% to about 25%, and M''' comprises from about 30% to about 70%.

10. The amorphous oxide-based compound of claim 7, having a substantially planar configuration for an electrolyte medium.

11. An electrolyte medium comprising at least one layer of amorphous lithium carbon lanthanum zirconium oxide, wherein a ratio of lanthanum to zirconium is about 1, and wherein the lithium carbon lanthanum zirconium oxide has an ionic conductivity of about 1 to 2 E-3 S/cm.

12. The electrolyte medium of claim 11, wherein said amorphous lithium carbon lanthanum zirconium oxide comprises by percentage of total number of atoms from about 0.1% to about 50% lithium, up to about 25% carbon, from about 0.1% to about 25% lanthanum, from about 0.1% to about 25% zirconium, and from about 30% to about 70% oxygen.

\* \* \* \* \*